United States Patent
Himi

(10) Patent No.: US 10,259,389 B2
(45) Date of Patent: Apr. 16, 2019

(54) DRIVING SUPPORT APPARATUS FOR A VEHICLE

(71) Applicant: TOYOTA JIDOSHA KABUSHIKI KAISHA, Toyota-shi, Aichi (JP)

(72) Inventor: Tomoyuki Himi, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/810,461

(22) Filed: Nov. 13, 2017

(65) Prior Publication Data
US 2018/0147984 A1    May 31, 2018

(30) Foreign Application Priority Data

Nov. 28, 2016    (JP) .................... 2016-230109

(51) Int. Cl.
*B60Q 9/00*    (2006.01)
*B60Q 1/34*    (2006.01)
*B62D 15/02*   (2006.01)

(52) U.S. Cl.
CPC ......... *B60Q 9/008* (2013.01); *B62D 15/0255* (2013.01); *B60Q 1/346* (2013.01); *B60Y 2400/3015* (2013.01); *B62D 15/029* (2013.01)

(58) Field of Classification Search
CPC .............................. B60Q 1/346; B60Q 9/008; B60Y 2400/3015; B62D 15/0255; B62D 15/029
See application file for complete search history.

(56) References Cited

U.S. PATENT DOCUMENTS 6,388,565 B1    5/2002    Bernhard et al.

FOREIGN PATENT DOCUMENTS

JP    2001-010433 A    1/2001
JP    2009-248892 A    10/2009

*Primary Examiner* — Charles J Han
(74) *Attorney, Agent, or Firm* — Oliff PLC

(57) ABSTRACT

When an automatic lane change system has a specific blinker be activated while a BSM (blind spot monitor) system is giving a first alert by turning on an indicator 11, a BSM ECU 10 does not give a second alert (blinking the indicator 11) so as to keep giving the first alert. The second alert is higher in an alert level than the first alert.

1 Claim, 8 Drawing Sheets

DRIVING SUPPORT APPARATUS FOR A VEHICLE

BACKGROUND OF THE INVENTION

Field of the Invention

The present invention relates to a driving support apparatus configured to alert a driver (give an alert to a driver) of a presence of a vehicle in a blind spot which is not reflected in side mirrors, when the driving support apparatus detects the vehicle.

Description of the Related Art

Hitherto, for example, as proposed in Japanese Patent Application Laid-open No. 2001-10433, a blind spot vehicle alert system that alerts the driver when it has detected a vehicle in the blind spot has been known. The blind spot vehicle alert system has been put into practical use, which has been referred to as a blind spot monitor, for example. The blind spot vehicle alert system has surround sensors, for example radar sensors. When at least one of the surround sensors detects a vehicle in the blind spot (vehicle outside angle of coverage) of side mirrors of an own vehicle, the blind spot vehicle alert system gives a first alert. The first alert can alert the driver of an presence of the vehicle in the blind spot.

While the blind spot vehicle alert system is giving the first alert, in other words, while the blind spot vehicle alert system has been detecting the vehicle in the blind spot, the driver may operate a blinker lever (turn signal lever) to activate blinkers (turn signals) on either side of the own vehicle and corresponding to the direction of the detected vehicle. In this case, the blind spot vehicle alert system detects activation of the turn signals to give a second alert that has a higher alert level than the first alert. For example, the blind spot vehicle alert system gives the second alert upon detection of the activation of the right hand side blinker, while it has been detecting the vehicle in a right blind spot of the own vehicle. The second alert has the driver confirm/make sure whether or not the steering operation the driver will perform can assure the safety. Thus, the second alert enables the driver to hold back performing the steering operation depending on the confirmation result.

The blind spot vehicle alert system gives the first alert and the second alert by using a right indicator included/embedded in a right hand side mirror or a left indicator included/embedded in a left hand side mirror. When the blind spot vehicle alert system detects the vehicle in the right blind spot, it activates the right indicator. When the blind spot vehicle alert system detects the vehicle in the left blind spot, it activates the left indicator. For example, the blind spot vehicle alert system turns on the indicator to give the first alert, and blinks (flashes intermittently) the indicator to give the second alert.

For example, as proposed in Japanese Patent Application Laid-open No. 2009-248892, an automatic lane change system has been known as another system for supporting a driving operation of the driver. When an automatic lane change request is generated, the automatic lane change system blinks the blinker and changes lanes of the own vehicle without a steering operation by the driver. When the automatic lane change system performs the automatic lane change, it provides steering torque using an electric power steering system to a steering unit to change lanes of the own vehicle.

The automatic lane change system monitors an object around the own vehicle by using the surround sensors. When the automatic lane change system confirms, based on the monitoring result, that there is no object such as another vehicle which may impede the lane change of the own vehicle, the automatic lane change system has the own vehicle change lanes.

SUMMARY OF THE INVENTION

A vehicle with both the blind spot vehicle alert system and the automatic lane change system may have the following problem.

It is preferable that the blind spot vehicle alert system alerts the driver of not only the vehicle that is in the blind spot but also the vehicle that is approaching the blind area rapidly. For this reason, the spot/area in which the vehicle to be regarded as the alert target is present is enlarged.

On the other hand, when the automatic lane change system has detected a vehicle which may impede the (safe) lane change of the own vehicle, it prohibits/stops having the own vehicle change lanes. A condition to be satisfied for the automatic lane change system to stop starting the automatic lane change (control) is different from a condition to be satisfied for the blind spot vehicle alert system to alert the driver. Specifically, the automatic lane change system detects/determines whether there is no vehicle which impede the safe lane change of the own vehicle in order to determine whether to have the own vehicle change lanes. The blind spot vehicle alert system alerts the driver of the presence of the vehicle satisfying a predetermined condition. The blind spot vehicle alert system alerts the driver when it has detected not only the vehicle which may impede the safe lane change of the own vehicle but also the vehicle which may not impede the safe lane change of the own vehicle.

Hereby, the following situation occurs. The blind spot vehicle alert system determines that there is a vehicle that is the alert target, whereas the automatic lane change system determines that there is no vehicle which may impede the safe lane change of the own vehicle.

Accordingly, a case may occur where the automatic lane change system has the own vehicle change lanes (performs the automatic lane change control) while the blind spot vehicle alert system is giving the first alert. When the automatic lane change system starts to perform the automatic lane change control, the blinker starts to flash intermittently (work). When the blind spot vehicle alert system has detected the flash (activation) of the blinker, it switches the alert from the first alert to the second alert. That is, the automatic lane change system starts to have the own vehicle change lanes, while the blind spot vehicle alert system is giving the second alert. The start of the lane change during the second alert may cause the driver to have reservations about whether or not the own vehicle can safely change lanes.

In order to avoid the above situation, the blind spot vehicle alert system may be configured to cancel/stop its function (for example, the blind spot vehicle alert system may turn off an alert display), when the automatic lane change system has the own vehicle change lanes. However, such cancel of the function of the blind spot vehicle alert system may cause the driver to have reservations about whether or not the surround sensors properly work.

The present invention has been made to solve the problems described above. An object of the present invention is to provide a driving support apparatus comprising the blind spot vehicle alert system and the automatic lane change system that can cause the driver to have no such reservations.

In order to achieve the above-mentioned object, a driving support apparatus for an own vehicle according to one of embodiments of the present invention comprises:

a blind spot vehicle alert system (10, 11, 12) for giving a first alert when the blind spot vehicle alert system has detected at least one of a (first) vehicle in a blind spot which is not reflected in a side mirror and a (second) vehicle which will be in the blind spot which will not be reflected in the side mirror (Yes at Step S21, No at Step S22, and Step S23), and for giving a second alert, which is higher in an alert level than the first alert, when a blinker is activated while the blind spot vehicle alert system is giving the first alert, the blinker being a specific blinker on either side of the own vehicle and corresponding to a direction of the vehicle that has been detected to cause the first alert (Yes at Step S22, and S25);

a lane change system (20, 12, 21, 22, 23, 30, 31) for having the own vehicle automatically change lanes without an operation of a steering wheel by a driver; and an alert control unit (10, 20) for prohibiting the second alert from being given to keep giving the first alert when the specific blinker starts to be activated owing to an operation of the lane change system (S14, Yes at Step S22, Yes at Step S24, S23) while the blind spot vehicle alert system is giving the first alert (No at Step S22, S23).

The driving support apparatus for an own vehicle according to the present invention comprises the blind spot vehicle alert system and the automatic lane change system. The blind spot vehicle alert system gives the first alert when it has detected at least one of the first vehicle and the second vehicle. The first vehicle is a vehicle in a blind spot which is not reflected in the side mirror. The second vehicle is a vehicle which will be in (enter) the blind spot, and thus will not be reflected in the side mirror. For example, the second vehicle is the vehicle that will reach/enter the blind spot within a predetermined time. The driving support apparatus can alerts/notifies the driver of a presence of the vehicle (first or second vehicle) that is not or will not be reflected in the side mirror.

When the specific blinker is activated while the blind spot vehicle alert system is giving the first alert, the blind spot vehicle alert system gives the second alert whose alert lever is higher than the first alert. The second alert has the driver confirm whether or not the steering operation which the driver will perform can assure the safety (safe driving). The second alert enables the driver to hold back (or not to start) the steering operation which the driver will perform, based on the confirmation result.

On the other hand, the automatic lane change system has the own vehicle automatically change lanes without the driver's operation of the steering wheel. For example, when the automatic lane change system receives a lane change request signal, the automatic lane change system gives a steering unit a steering torque corresponding to a direction indicated by the lane change request signal in order to perform/conduct the automatic lane change. For example, the lane change request signal may be transmitted/generated when the driver performs a specific operation. Alternatively, the lane change request signal may be transmitted/generated when a lane change is required based on a route determined by a navigation apparatus.

A case may occur where the driving support system comprising the blind spot vehicle alert system and the automatic lane change system performs the automatic lane change while the blind spot vehicle alert system is giving the first alert. If the blind spot vehicle alert system switches alerts from the first alert to the second alert when it has detected activating of the blinker owing to the automatic lane change, the switch of the alert from the first alert to the second alert may cause the driver to have reservations about whether or not the own vehicle can change lanes safely.

In view of the above, the driving support apparatus according to the present invention comprises the alert control unit. The alert control unit prohibits the blind spot vehicle alert system from giving the second alert so as to keep giving the first alert, when the automatic lane change system activates the specific blinker work, the specific blinker being on either side of the own vehicle and corresponding to a direction of the vehicle that has been detected to cause the blind spot vehicle alert system to give the first alert, while the blind spot vehicle alert system is giving the first alert. Consequently, the driving support apparatus does not cause the driver to have reservations. Furthermore, since the driving support apparatus keeps giving the first alert, the driver can confirm that the blind spot vehicle alert system is properly and normally monitoring vehicles around the own vehicle. Accordingly, the driving support apparatus according to the present invention can prevent the driver from having reservations.

In the above description, in order to facilitate the understanding of the invention, reference symbols used in embodiments of the present invention are enclosed in parentheses and are assigned to each of the constituent features of the invention corresponding to the embodiment. However, each of the constituent features of the invention is not limited to the embodiments as defined by the reference symbols.

DESCRIPTION OF THE PREFERRED EMBODIMENTS

Now, description is made of a driving support apparatus according to an embodiment of the present invention with reference to the accompanying drawings.

Figure 1:
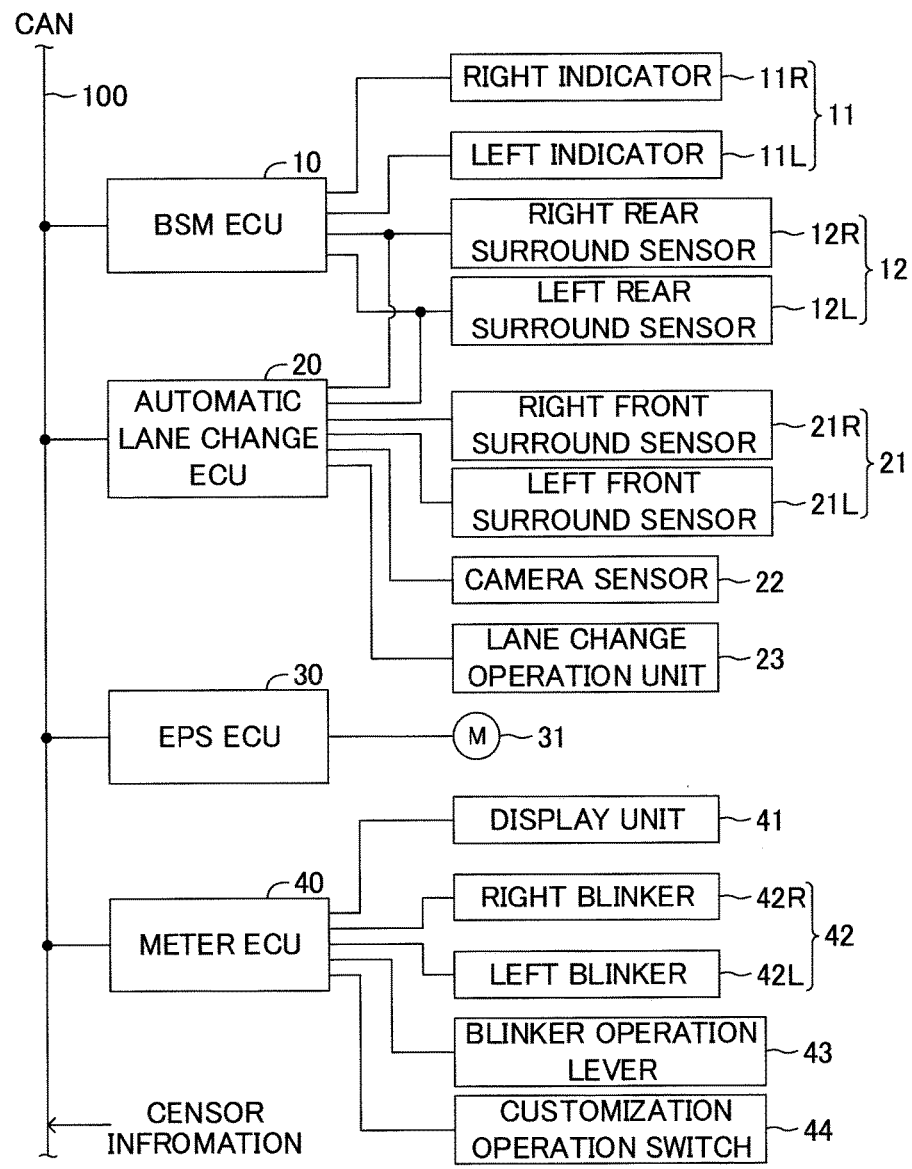
FIG. 1 is a schematic configuration diagram of a driving support apparatus according to an embodiment of the present invention.

In FIG. 1, a schematic configuration of a driving support apparatus according to the embodiment of the present invention is illustrated. The driving support apparatus is mounted on a vehicle (hereinafter also referred to as "own vehicle" to be distinguished from other vehicles). The driving support apparatus includes a blind spot monitor ECU 10, an automatic lane change ECU 20, an electric power steering ECU 30, and a meter ECU 40.

Each of these ECUs is an electric control unit including a microcomputer as a main part. These ECUs are connected with each other via controller area network (CAN) 100 so as to be able to transmit and receive information. In the specification of the present invention, the microcomputer includes a CPU, a ROM, a RAM, a non-volatile memory, and an interface I/F. The CPU achieves various functions by executing instructions (programs, routines) stored in the ROM. Some or all of the ECUs may be integrated into a single ECU.

Sensors (not shown) detect a vehicle state and an operation state of the own vehicle. The sensor information (e.g. information on a vehicle speed, a horizontal acceleration, a vertical acceleration, a yaw rate, a steering angle, a steering torque, an accelerator operation amount, and a brake operation amount) detected by the sensors is transmitted to CAN 100, so that the sensor information is available to each of the ECUs.

The blind spot monitor ECU 10 is a core control device of a blind spot monitor system. Hereinafter, the blind spot monitor system is referred to as a "BSM system", and the blind spot monitor ECU 10 is referred to as a "BSM ECU 10". The BSM system corresponds to a blind spot vehicle alert system in the present invention. A right indicator 11R, a left indicator 11L, a right rear surround sensor 12R, and a left rear surround sensor 12L are connected to the BSM ECU 10.

Figure 2:
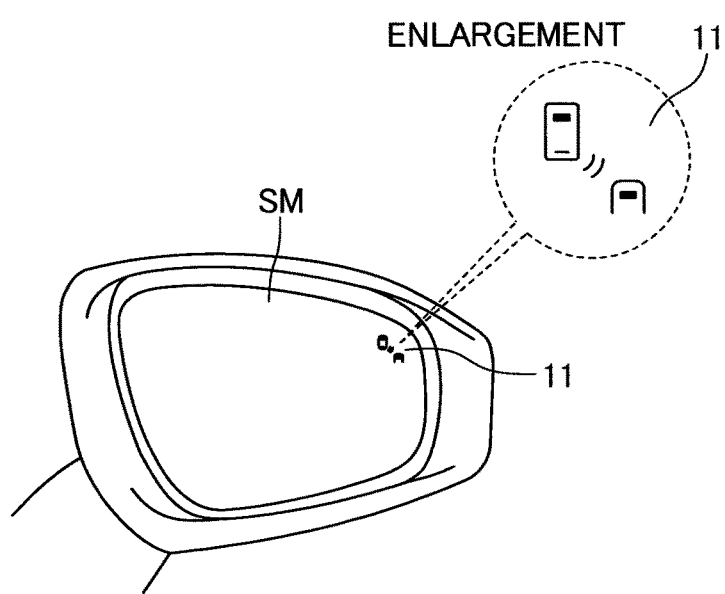
FIG. 2 is a front view illustrating a side mirror comprising an indicator.

The right indicator 11R and the left indicator 11L give alerts to the driver. The right indicator 11R is included in (built into) a right hand side mirror. The left indicator 11L is included in (built into) a left hand side mirror. The right indicator 11R and the left indicator 11L have the same configuration as each other. When the right indicator 11R and the left indicator 11L are not required to be distinguished from each other, the right indicator 11R and the left indicator 11L are hereinafter collectively referred to as "indicators 11". As illustrated in FIG. 2 (illustrating the right indicator 11R), each of the indicators 11 includes LEDs built into a part of a mirror of each of the side mirrors SM. An enlarged view of the right indicator 11R is illustrated in a right side area of FIG. 2. A turn-on signal provided by the BSM ECU 10 turns on each of the indicators 11 that receives the turn-on signal. A blink signal provided by the BSM ECU 10 blinks (or intermittently flashes) each of the indicators 11 that receives the blink signal.

The right rear surround sensor 12R is a radar sensor disposed at a right rear corner of a vehicle-body. The left rear surround sensor 12L is a radar sensor disposed at a left rear corner of the vehicle-body. An area which the right rear surround sensor 12R scans/covers is different from an area that the left rear surround sensor 12L scans/covers, but the right rear surround sensor 12R and the left rear surround sensor 12L have the same configuration as each other. When the right rear surround sensor 12R and the left rear surround sensor 12L are not required to be distinguished from each other, the right rear surround sensor 12R and the left rear surround sensor 12L are hereinafter collectively referred to as "rear surround sensors 12".

Each of the rear surround sensors 12 comprises a radar transmitting-receiving unit (not shown) and a signal processing unit (not shown). The radar transmitting-receiving unit transmits a millimeter radio wave, and receives the millimeter radio wave (the reflected radio wave) reflected by an 3-D object (e.g., another vehicle, a pedestrian, a bicycle, a building, or the like) within an area which the transmitted millimeter radio wave can reach. The signal processing unit detects the object based on a phase difference between the transmitted millimeter radio wave and the received millimeter radio wave, an attenuation level of the reflected radio wave, a time from transmitting the millimeter radio wave until receiving the reflected radio wave, and the like.

The right rear surround sensor 12R can detect an object(s) in a right detected area. This right detected area is an area between a first line intersecting a center axis extending from the right rear corner in a right backward direction at a predetermined angle and a second line intersecting the center axis at the predetermined angle. The left rear surround sensor 12L can detect an object(s) in a left detected area. This left detected area is an area between a third line intersecting a center axis extending from the left rear corner in a left backward direction at a predetermined angle and a fourth line intersecting the center axis at the predetermined angle. The right detected area includes a blind spot (a right blind spot). An object in the right blind spot is not reflected in the right hand side mirror. The left detected area includes a blind spot (a left blind spot). An object in the left blind spot is not reflected in the left hand side mirror.

Each of the rear surround sensors 12 repeatedly obtains information about the object (hereinafter referred to as "rear surround information") and provides the rear surround information to the BSM ECU 10 every time a predetermined time elapses. For example, the rear surround information includes a distance between the own vehicle and the object, a relative speed of the object with respect to the own vehicle, and a relative position of the object with respect to the own vehicle.

The main aim of the BSM system is to alert the driver of a presence of the vehicle(s) in the blind spots. The object may be hereinafter referred to as an "other vehicle".

Figure 3:
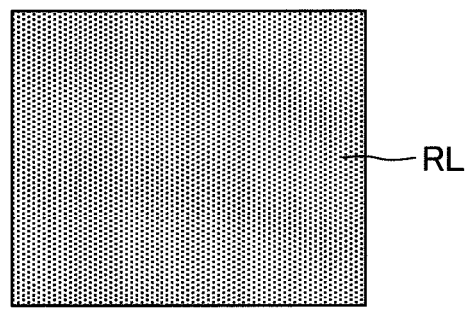
FIG. 3 is a plan view illustrating blind spots.
Figure 3:
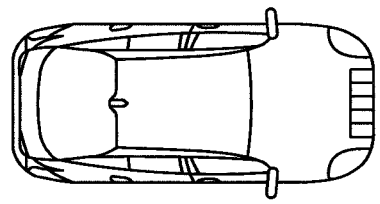
Figure 3:
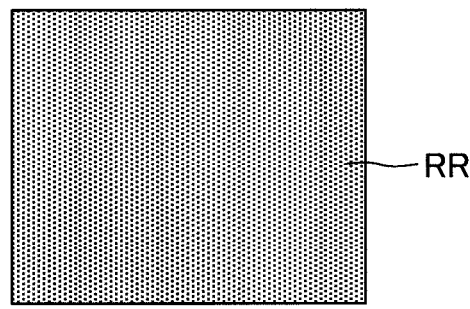

As illustrated in FIG. 3, the BSM ECU 10 memorizes/ stores positions of a right blind area RR and a left blind area RL relative to the own vehicle. The right blind area RR is a predetermined area which includes a predetermined specific first area that an object(s) in the specific first area cannot be reflected in the right hand side mirror (the area that is likely to be a blind spot of the right hand side mirror). The blind area RL is a predetermined specific second area that an object(s) in the specific second area cannot be reflected in the left hand side mirror (the area that is likely to be a blind spot of the left hand side mirror). When the right blind area RR and the left blind area RL are not required to be distinguished from each other, the right blind area RR and the left blind area RL are hereinafter collectively referred to as "blind areas R". Each of the blind areas R has, for example, a width direction range from 0.5 m to 3.5 m from each of the right side end and the left side end of the own vehicle to the respective external direction, and a longitudinal direction range from a point located at 1 m frontward away from the rear end of the own vehicle to a point located at 4 m backward away from the rear end of the own vehicle. The blind areas R can be determined in advance to a suitable range for each of the vehicles. The ranges of the blind areas R are not limited to the above ranges.

Figure 4:
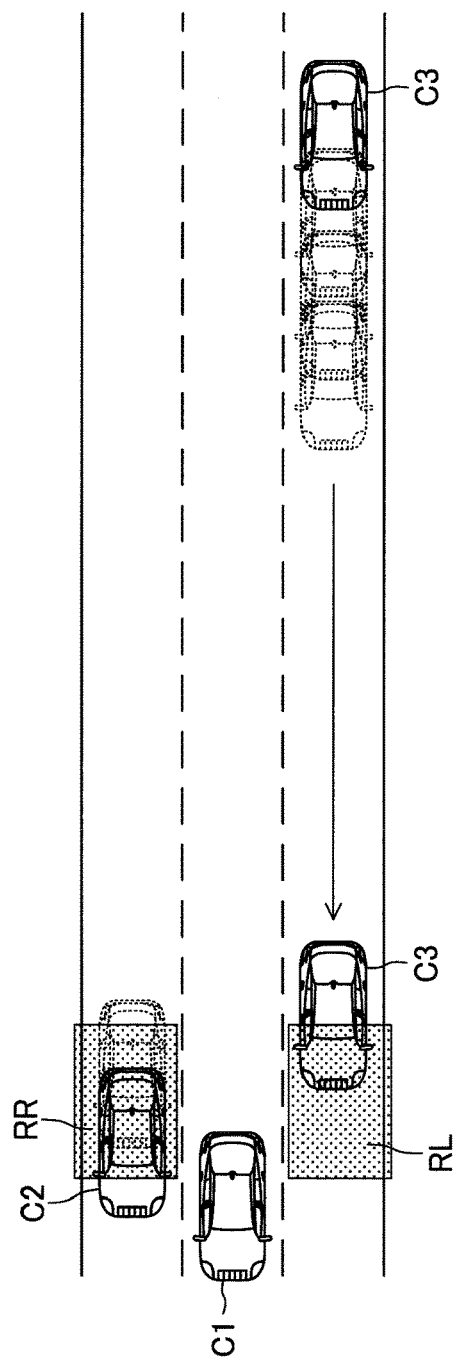
FIG. 4 is a plan view illustrating alert targets.

The BSM ECU 10 determines whether or not there is a vehicle whose at least one portion is in either of the blind areas R, based on the rear surround information obtained by the rear surround sensors 12. When the BSM ECU 10 determines there is the vehicle whose at least one portion is in either of the blind areas R, the BSM ECU 10 regards/ treats this vehicle as an alert target. For example, as illustrated in FIG. 4, the BSM ECU 10 regards a "vehicle C2 travelling in the right blind area RR on a right lane adjacent to a lane where the own vehicle is travelling" as the alert target.

The BSM ECU 10 determines whether or not there is a vehicle that will be in (or enter) either of the blind areas R based on the rear surround information obtained by the rear surround sensors 12. When the BSM ECU 10 determines that there is the vehicle that will be in (or enter) either of the blind areas R, the BSM ECU 10 regards/treats the vehicle as the alert target. For example, as illustrated in FIG. 4, the BSM ECU 10 regards a "vehicle C3 approaching rapidly the left blind area RL on a left lane adjacent to the lane where the own vehicle is travelling" as the alert target.

The BSM ECU 10 determines whether or not each of the vehicles that has been detected by the rear surround sensors 12 will be in either of the blind areas R, based on the distance between the own vehicle and each of the detected vehicles, the relative speed of each of the detected vehicles with respect to the own vehicle, the relative position of each of the detected vehicle with respect to the own vehicle, and the like. The above predetermined time can be set in advance to a preferable value by the driver. It should be noted that the rear surround sensors 12 are configured to be able to detect an object(s) in predetermined areas which is behind of the blind areas R so that the sensors 12 can detect not only a vehicle in the blind areas R but also a vehicle C3 approaching rapidly either of the blind areas R.

When the alert target is present, the BSM ECU 10 turns on one of indicators 11 corresponding to one of the blind areas R in which the alert target is present or which the alert target is approaching. That is, when the alert target is present in the right blind area RR or the alert target is approaching the right blind area RR, the BSM ECU 10 turns on the right indicator 11R. When the alert target is present in the left blind area RL or the alert target is approaching the left blind area RL, the BSM ECU 10 turns on the left indicator 11L. Hereby, the BSM ECU 10 can notify/alert the driver of the presence of the alert target that is not or will not be reflected in the side mirrors.

The BSM ECU 10 receives a blinker activating signal transmitted to the CAN 100, while the one of the indicators 11 is lighted (on). When the BSM ECU 10 receives the blinker activating signal of one of the blinkers 42 which is on the same side/direction as a side/direction of one of the indicators 11 which is being on (e.g., the blinker activating signal of the right blinker 42R while the right indicator 11R is being on, or the blinker activating signal of the left blinker 42L while the left indicator 11L is being on), in other words, when the BSM ECU 10 receives the blinker activating signal of the blinker located in the same direction as the direction determined by the position of the alert target, the BSM ECU 10 blinks (or flashes intermittently) that one of the indicators 11. Thus, the status of that one of indicators 11 is switched from "being on" to "being blinked".

While one of the indicators 11 is being on in response to the detection of the alert target, the driver may perform a blinker operation with the intention to have the own vehicle turn/move to the direction corresponding to the alert target. When the driver performs the above blinker operation, the one of the indicators 11 is blinked (or flashed intermittently). This blinking can raise the alert level to the driver. This blinking has the driver confirm whether or not the steering operation which the driver will perform can assure the safety, and enables the driver to hold back performing the steering operation depending on the confirmation result.

Turing on one of the indicators 11 corresponds to a start of a first alert of the present invention. Blinking the one of the indicators 11 corresponds to a second alert of the present invention. The embodiment of the present invention may give the second alert by outputting sound such as buzzer sound and/or voice announcement instead of the blinking of the one of the indicators 11 or in addition to the blinking of the one of the indicators 11. The embodiment may give the second alert by giving the driver physical vibration, such as by vibrating a driver sheet and/or a steering wheel, instead of or in addition to the blinking of the one of the indicators 11. The first alert can be any type of alert which is freely selected as long as the alert level of the first alert is lower than that of the second alert.

Keeping on a lighted (turned-on) state of one of the indicators 11 is hereinafter referred to as the "first alert", and blinking one of the indicators 11 is hereinafter referred to as the "second alert".

The BSM system comprises the BSM ECU 10, the right indicator 11R, the left indicator 11L, the right rear surround sensor 12R, and the left rear surround sensor 12L.

An automatic lane change ECU 20 is a core control device of the automatic lane change system. A right front surround sensor 21R, a left front surround sensor 21L, the right rear surround sensor 12R, the left rear surround sensor 12L, a camera sensor 22, and a lane change operation unit 23 are connected to the automatic lane change ECU 20. The automatic lane change system and the BSM system use the right rear surround sensor 12R and the left rear surround sensor 12L. The right rear surround sensor 12R and the left rear surround sensor 12L provide the rear surround information to the automatic lane change ECU 20.

The right front surround sensor 21R is a radar sensor disposed at a right front corner of the vehicle-body. The left front surround sensor 21L is a radar sensor disposed at a left front corner of the vehicle-body. An area which the right front surround sensor 21R scans/covers is different from an area which the left front surround sensor 21L scans/covers, but the right front surround sensor 21R and the left front surround sensor 21L have the same configuration as each other. When the right front surround sensor 21R and the left front surround sensor 21L are not required to be distinguished from each other, the right front surround sensor 21R and the left front surround sensor 21L are hereinafter collectively referred to as "front surround sensors 21".

Each of the front surround sensors 21 comprises a radar transmitting-receiving unit (not shown) and a signal processing unit (not shown). The radar transmitting-receiving unit transmits a millimeter radio wave, and receives the millimeter radio wave (the reflected radio wave) reflected by an 3-D object (e.g., another vehicle, a pedestrian, a bicycle, a building, or the like) within an area which the transmitted millimeter radio wave can reach. The signal processing unit detects the object based on a phase difference between the transmitted millimeter radio wave and the received millimeter radio wave, an attenuation level of the reflected radio wave, a time from transmitting the millimeter radio wave until receiving the reflected radio wave, and the like.

The right front surround sensor 21R can detect an object(s) in a right detected area. This right detected area is an area between a fifth line intersecting a center axis extending from the right front corner in a right frontward direction at a predetermined angle and a sixth line intersecting the center axis at the predetermined angle. The left front surround sensor 21L can detect an object(s) in a left detected area. This left detected area is an area between a seventh line intersecting a center axis extending from the left front corner in a left frontward direction at a predetermined angle and a eighth line intersecting the center axis at the predetermined angle. Each of the front surround sensors 21 repeatedly obtains information about the detected object (hereinafter referred to as "front surround information") and provides the front surround information to the automatic lane change ECU 20 every time the predetermined time elapses. For example, the front surround information includes a distance between the own vehicle and the object, a relative speed of the object with respect to the own vehicle, and a relative position of the object with respect to the own vehicle.

The camera sensor 22 comprises a camera (not shown) and a image processing unit (not shown). The camera photographs a view ahead of the own vehicle to obtain image data. The image processing unit recognizes a left white line and a right white line (lane markers) on a road based on the image data obtained by the camera so as to obtain lane information including a lane shape and a position relation between a lane and the own vehicle. The camera sensor 22 provides the lane information to the automatic lane change ECU 20.

The image processing unit can detect the object ahead of the own vehicle based on the image data. Therefore, the image processing unit may obtain the front surrounding information in addition to the lane information by calculation. In this case, for example, a synthesizing processing unit (not shown) may be provided. The synthesizing processing unit synthesizes the front surrounding information obtained by the front surround sensors 21 and the front surrounding information obtained by the camera sensor 22 to generate more accurate front surrounding information. The synthesizing processing unit provides/transmitts the synthesized front surrounding information to the automatic lane change ECU 20.

The driver operates the lane change operation unit 23 to start the automatic lane change. For example, the lane change operation unit 23 is installed in a pad portion of the steering wheel. The lane change operation unit 23 is an operation switch that is capable of specifying a start time point of the automatic lane change and a lane change direction (right or left). The lane change operation unit 23 specifies the lane change direction based on an operation given to the unit 23 by the driver. For example, the lane change operation unit 23 may comprise an operation unit for a lane change to the right lane and an operation unit for a lane change to the left lane. Alternatively, the lane change unit 23 may comprise a single lane change operation unit. The direction of the operation of this single lane change operation unit by the driver can specify the lane change direction.

The automatic lane change system is a system to have the own vehicle change lanes without a driver's operation of the steering wheel. The automatic lane change system has the electric power steering system provide/generate the steering torque to change lanes. The electric power steering system includes an electric power steering ECU 30 that is a control device of the electric power steering system and a steering motor 31. The electric power steering ECU 30 is hereinafter referred to as an "EPS ECU 30".

The EPS ECU 30 includes a microcomputer and a motor driving circuit as main parts. A steering torque sensor (not shown) installed in a steering shaft detects the steering torque given/added to the steering wheel by the driver. The EPS ECU 30 obtains the steering torque detected by the steering torque sensor, and controls the steering motor 31 based on the obtained steering torque to give the steering torque to the steering unit. Hereby, the EPS ECU 30 assists the steering operation by the driver.

When the EPS ECU 30 receives a steering request/instruction from the automatic lane change system 20, the EPS ECU 30 drives the steering motor 31 in accordance with a control amount specified by the steering request to generate the steering torque. This steering torque is different from steering assist torque given to the steering unit to decrease a force/torque necessary for the driver to operate the steering wheel. This steering torque means a torque given to the steering unit in response to the steering request from the automatic lane change ECU 20 to have the own vehicle change lanes without the driver's operation of the steering wheel.

The automatic lane change system comprises the automatic lane change ECU 20, the right front surround sensor 21R, the left front surround sensor 21L, the right rear surround sensor 12R, the left rear surround sensor 12L, the camera sensor 22, the lane change operation unit 23, the EPS ECU 30, and the steering motor 31 as main parts.

When the driver operates the lane change operation unit 23, the automatic lane change system has the own vehicle change lanes in the direction (right or left) specified by the operation of the operation unit 23.

The automatic lane change ECU 20 receives an operation signal from the lane change operation unit 23 and determines whether or not the received operation signal is a signal (hereinafter, simply referred to as a "lane change request signal") including a request for starting to perform the automatic lane change (a request for starting to change lanes automatically). When the driver operates the lane change operation unit 23, the lane change operation unit 23 transmits/generates the lane change request signal. The lane change request signal is information representing the driver's intention that the driver wants to receive the support of the automatic lane change. The lane change request signal is a trigger for starting the automatic lane change. The lane change request signal includes information on the direction of the automatic lane change (hereinafter simply referred to as a "request direction"). That is, the lane change request signal includes information specifying which adjacent lane (right lane or left lane) the driver wants to move to, When the automatic lane change ECU 20 receives the lane change request signal from the lane change operation unit 23, the automatic lane change ECU 20 determines whether or not the own vehicle can change lanes safely based on the front surrounding information, the rear surrounding information, and the lane information. When the automatic lane change ECU 20 determines that the own vehicle can change lanes safely, the automatic lane change ECU 20 has the own vehicle change lanes from the current lane to the adjacent lane corresponding to the request direction. In this case, the automatic lane change ECU 20 decides a target path (line) to change lanes from the current traveling lane to the adjacent lane, calculates a target steering angle to have the own vehicle travel along the target path, and transmits the steering request including the target steering angle to the EPS ECU 30. The EPS ECU 30 controls the steering motor 31 in accordance with the steering request. The automatic lane change ECU 20 transmits a blinker blink request corresponding to the request direction to the meter ECU 40 while carrying out the automatic lane change.

The meter ECU 40 will next be described. A display unit 41, a right blinker (blinker lamps/turn signal lamps) 42R, a left blinker (blinker lamps/turn signal lamps) 42L, a blinker operation lever 43, and a customization operation switch 44 are connected to the meter ECU 40. When the right blinker 42R and the left blinker 42L are not required to be distinguished from each other, the right blinker 42R and the left blinker 42L are hereinafter collectively referred to as "blinkers 42".

The display unit 41 is a multi-information display mounted/disposed in front of the driver sheet. The meter ECU 40 displays not only a measured values of the vehicle speed and the like but also various information on the display unit 41. When the meter ECU 40 detects the operation of the blinker operation lever 43, the meter ECU 40 blinks ("activates/works" in some cases) one of the blinkers 42 corresponding to an operated direction of the blinker operation lever 43.

The meter ECU 40 transmits a blinker activating signal to the CAN 100 while it is blinking the one of the blinkers 42. In addition, when the meter ECU 40 receives the blinker blink request from any one of the ECUs including the automatic lane change ECU 20, the meter ECU 40 blinks/activates (or flashes intermittently) one of the blinkers 42 corresponding to the direction specified by the blinker blink request. In this case, the meter ECU 40 also transmits the blinker activating signal to the CAN 100.

The driver operates the customization operation switch 44 to customize the systems to his or her favorite settings. For example, the customization operation switch 44 is installed in the pad of the steering wheel. When the driver operates the customization operation switch 44, a customization screen is displayed on the display unit 41. The driver customizes modes of the systems to his or her favorite modes via the customization screen. For example, the driver can set the BSM system to on-state or off-state, and set the automatic lane change system to on-state or off-state. As described above, the BSM system regards/treats the "vehicle that will enter one of the blind areas within a predetermined time" as the alert target. The driver can customize the predetermined time by using the customization operation switch 44. In other words, the driver can determine in advance what vehicle should be regarded as the alert target among vehicles approaching each of the blind areas, by using the customization operation switch 44.

As described above, the driving support apparatus according to the present embodiment comprises the BSM system and the automatic lane change system. These systems work/operate independently from each other. When the automatic lane change system determines that the own vehicle can change lanes safely, the automatic lane change system has the own vehicle change lanes. Whereas, the BSM system detects and regards a vehicle(s) that is present in the blind area and/or a vehicle(s) that will be present in the blind area, as the alert target(s). Thus, in some cases, the vehicle regarded as the alert target by the BSM system may be a vehicle which does not to impede the automatic lane change of the own vehicle. This situation tends to happen, especially when the "above-mentioned predetermined time to detect/regard a vehicle as the alert target" is set/customized to be a relatively long time.

Hereby, the following situation occurs. While the blind spot vehicle alert system has been detecting a vehicle which is regarded as the alert target, the automatic lane change system determines that the own vehicle can change lanes safely.

Therefore, a situation is considered where the automatic lane change system performs the automatic lane change (the automatic lane change system has the own vehicle change lanes automatically) while the blind spot vehicle alert system is giving the first alert. When the automatic lane change system performs the automatic lane change, the blinker 42 is activated/works. At this time, the blind spot vehicle alert system receives the blinker activating signal, and therefore, switches alerts from the first alert (lighting the indicator) to the second alert (blinking the indicator). Hereby, the automatic lane change system starts to perform the automatic lane change while the blind spot vehicle alert system is giving the second alert. This start of the automatic lane change may cause the driver to have reservations about whether or not the own vehicle can safely change lanes.

In order to avoid the above situation, the blind spot vehicle alert system may be configured to cancel/stop its function (for example, the blind spot vehicle alert system may turn off the indicator), when the automatic lane change system performs the automatic lane change. However, such canceling/stopping the function of the blind spot vehicle alert system may cause the driver to have reservations about whether or not the sensors for monitoring surroundings that are used by the blind spot vehicle alert system and the automatic lane change system properly and normally work.

In view of the above, the driving support apparatus of the present embodiment is configured as follows. When the automatic lane change system has the "blinker 42 on either side of the own vehicle corresponding to a direction (side) of the alert target causing the first alert" start to be activated (work) while the BSM system is giving the first alert, the driving support apparatus prohibits the second alert from being given so as to continue the first alert. That is, when a specific blinker of the blinkers 42 works (or is activated) while the blind spot vehicle alert system is giving the first alert, the first alert continues to be given instead of the second alert. The specific blinker is one for a right direction turn or for a left direction turn of the own vehicle to indicate a moving direction of the own vehicle, and the specific blinker corresponds to a position of the vehicle which is regarded as the alert target by the blind spot vehicle alert system. The following describes the concrete processes of the driving support apparatus referring to FIG. 5A and FIG. 5B.

Figure 5A:
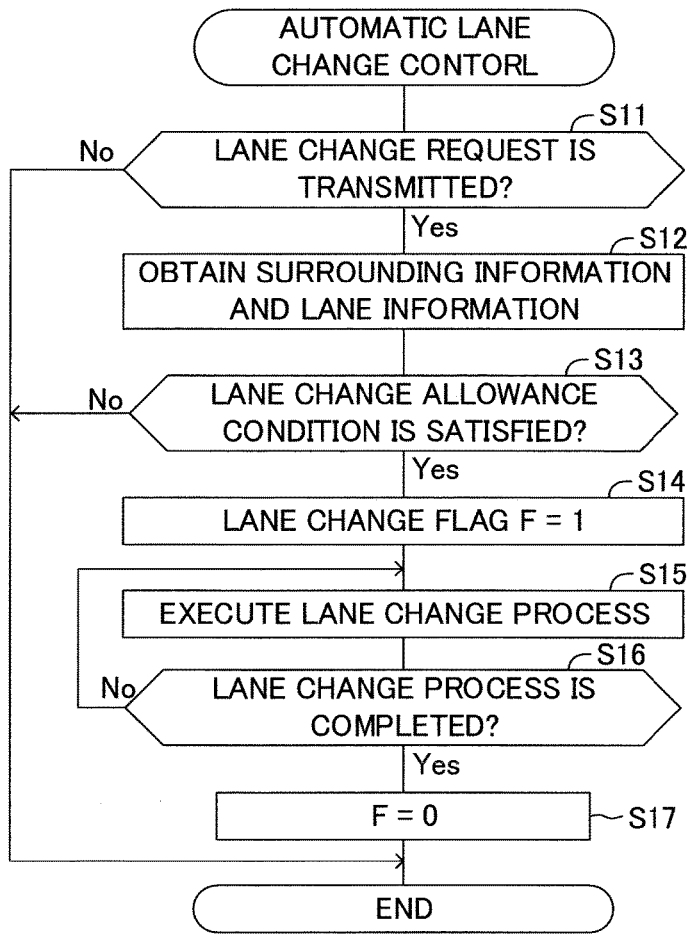
FIG. 5A is a flowchart illustrating an automatic lane change control routine.
Figure 5B:
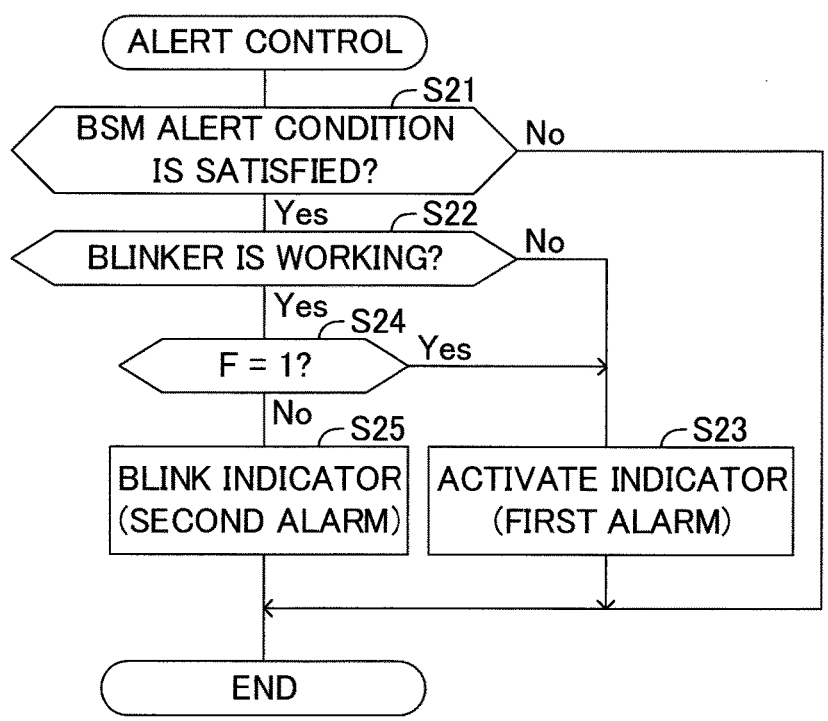
FIG. 5B is a flowchart illustrating an alert control routine.

The flowchart illustrated in FIG. 5A represents an automatic lane change control routine executed by the automatic lane change ECU 20, and the flowchart illustrated in FIG. 5B represents an alert control routine executed by the BSM ECU 10. The automatic lane change ECU 20 repeatedly executes the automatic lane change control routine in predetermined calculation periods. The BSM ECU 10 repeatedly executes the alert control routine in predetermined calculation periods.

After the automatic lane change ECU 20 activates the automatic lane change control routine, the automatic lane change ECU 20 determines whether or not the lane change operation unit 23 is transmitting (outputting) the lane change request signal, at Step S11. When the lane change operation unit 23 is not transmitting/outputting the lane change request signal, the automatic lane change ECU 20 tentatively terminates the automatic lane change control routine. The automatic lane change ECU 20 repeats the processing described above every time the predetermined calculation period elapses. When the driver operates the lane change operation unit 23, and thus, the lane change operation unit 23 transmits/outputs the lane change request signal, the automatic lane change ECU 20 obtains the front surrounding information, the rear surrounding information, and the lane information, at Step S12. Subsequently, at Step S13, the automatic lane change ECU 20 determines whether or not a lane change allowance condition is satisfied, based on the obtained information. The lane change allowance condition is a basis for determining whether or not the own vehicle may change (or is allowed to change) lanes in the direction indicated by the lane change request signal. For example, the lane change allowance condition is satisfied, when the automatic lane change ECU 20 has been successfully recognized the white lines of the adjacent lane in the direction indicated by the lane change request signal and has determined that the distance between the own vehicle and any one of other vehicles is equal to or longer than a threshold which is determined based on the vehicle speed.

When the lane change allowance condition is not satisfied, the automatic lane change ECU 20 tentatively terminates the automatic lane change control routine. That is, the lane change ECU 20 does not perform the automatic lane change (automatic lane change control). On the other hand, when the lane change allowance condition is satisfied, the automatic lane change ECU 20 sets a value of a lane change flag F to "1" at Step S14. The lane change flag F, when it is set to "1", represents that the lane change ECU 20 is performing the automatic lane change. The lane change flag F, when it is set to "0", represents that the lane change ECU 20 is not performing the automatic lane change. The lane change ECU 20 repeatedly transmits the value of the lane change flag F to the CAN 100 every time the predetermined calculation period elapses. This transmission process is not illustrated in the flowchart. An initial value of the lane change flag F is set to be "0".

Subsequently, the automatic lane change ECU 20 executes lane change process at Step S15. For example, the automatic lane change ECU 20 decides the target path to change lanes from the current lane on which the own vehicle is now traveling to the adjacent lane, calculates the target steering angle to have the own vehicle travel along the target path, and transmits the steering request including the target steering angle to the EPS ECU 30. In addition, the automatic lane change ECU 20 repeatedly transmits the blinker blink request including the lane change direction to the meter ECU 40 while executing the lane change process.

Consequently, the own vehicle automatically changes lanes from the current lane to the adjacent lane with blinking one of the blinkers 42 without the steering operation by the driver. The automatic lane change ECU 20 determines whether or not the lane change process has been completed at Step S16. The automatic lane change ECU 20 repeats executing Step S15 and Step S16 until the automatic lane change ECU 20 completes the lane change process.

When the automatic lane change ECU 20 has completed the lane change process (Yes at Step S16), the automatic lane change ECU 20 sets the value of the lane change flag F to "0" at Step S17. Thereafter, the automatic lane change ECU 20 tentatively terminates the automatic lane change routine.

Figure 6:
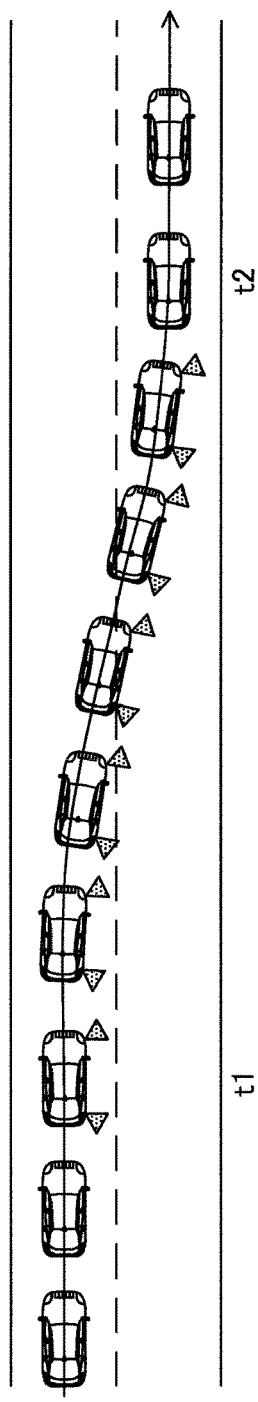
FIG. 6 is a plan view illustrating a traveling track of an own vehicle during an automatic lane change.

In FIG. 6, a traveling track/trajectory of the own vehicle while the automatic lane change has been performed is illustrated. The automatic lane change ECU 20 that has received the lane change request signal starts the automatic lane change at a time point t1 at which the lane change allowance condition is satisfied. The own vehicle slowly changes the traveling path toward the adjacent lane, with blinking the one of the blinkers 42. The automatic lane change ECU 20 completes the automatic lane change at a time point t2 when the own vehicle has reached the center of the adjacent lane and a direction of the own vehicle has become parallel with the adjacent lane. When the automatic lane change ECU 20 completes the automatic lane change, the one of the blinkers 42 stops blinking.

The following describes the alert control routine (FIG. 5B). After the BSM ECU 10 activates the alert control routine, the BSM ECU 10 determines whether or not a BSM alert condition is satisfied based on the rear surround information detected by the rear surround sensors 12 at Step S21. The BSM alert condition is satisfied, when the BSM ECU 10 has detected at least one of a vehicle (first vehicle) that is present in one of the blind areas R and a vehicle (second vehicle) that will be present in (or enter) one of the blind areas R within the predetermined time.

When the BSM alert condition is not satisfied, the BSM ECU 10 tentatively terminates the alert control routine. The BSM ECU 10 repeats the processing described above. When the BSM alert condition is satisfied, the BSM ECU 10 determines whether or not one of the blinkers 42 corresponding to the direction/side where the alert target is present (hereinafter also referred to as "target direction") is working (is being blinked) at Step S22. That is, the BSM ECU 10 determines whether or not one of the blinkers 42 corresponding to the position of the alert target is detected is blinking. In this case, the BSM ECU 10 determines whether or not the blinker activating signal indicating the target direction is transmitted to the CAN 100.

When the one of the blinkers 42 corresponding to the target direction is not working (No at Step S22), the BSM ECU 10 turns on one of the indicators 11 corresponding to the target direction. That is, the BSM ECU 10 gives the first alert. Hereby, the BSM ECU 10 can alert/notify the driver of the presence of the vehicle that is not reflected in the side mirror.

On the other hand, when the one of the blinkers 42 is working (Yes at Step S24), the BSM ECU 10 obtains the value of the lane change flag F transmitted to the CAN 100. The BSM ECU 10 determines whether or not the value of the obtained lane change flag F is "1", in other words, whether or not the automatic lane change is being performed. When the automatic lane change is not being performed (No at Step S24), the BSM ECU 10 blinks (flashes intermittently) the one of the indicators 11 corresponding to the target direction, at Step S25. That is, the BSM ECU 10 gives the second alert that is higher in the alert level than the first alert. Hereby, the BSM ECU 10 can have the driver confirm whether or not the steering operation the driver will perform can assure the safety, and enables the driver to hold back the steering operation based on the confirmation result.

When the automatic lane change is being performed (Yes at Step S24), the BSM ECU 10 proceeds to Step S23 to give the first alert. Thereby, when the automatic lane change is started, and thus the one of the blinkers 42 starts to work (be activated) while the BSM ECU 10 is giving the first alert, giving the second alert is prohibited so as to continue to give the first alert.

After the BSM ECU 10 executes the process of Step S23 or Step S25, the BSM ECU 10 tentatively terminates the alert control routine. The BSM ECU 10 repeats executing the alert control routine every time the predetermined calculation period elapses.

The driving support apparatus of the embodiment described above comprises the BSM system and the automatic lane change system. When the automatic lane change is started, and thus the one of the blinkers 42 corresponding to the target direction starts to work (be activated to be flashed intermittently) while the first alert is being given by the BSM system, giving the second alert is prohibited and the first alert continues to be given. Hereby, the driving support apparatus does not cause the driver to have reservations about whether or not the own vehicle can safely change lanes. Furthermore, since the driving support apparatus keeps giving the first alert even in the above situation, the driver can confirm that the blind spot vehicle alert system is properly monitoring vehicles around the own vehicle. Accordingly, the driving support apparatus according to the present embodiment does not cause the driver to have reservations.

Modification Example

In the above described embodiment, the BSM ECU 10 obtains the value of lane change flag F. When the obtained value of the lane change flag F is "1", the BSM ECU 10 does not give the second alert. In the modification example, alternatively, when the automatic lane change is being executed/performed, the meter ECU 40 may be configured not to transmit the blinker activating signal.

Figure 7:
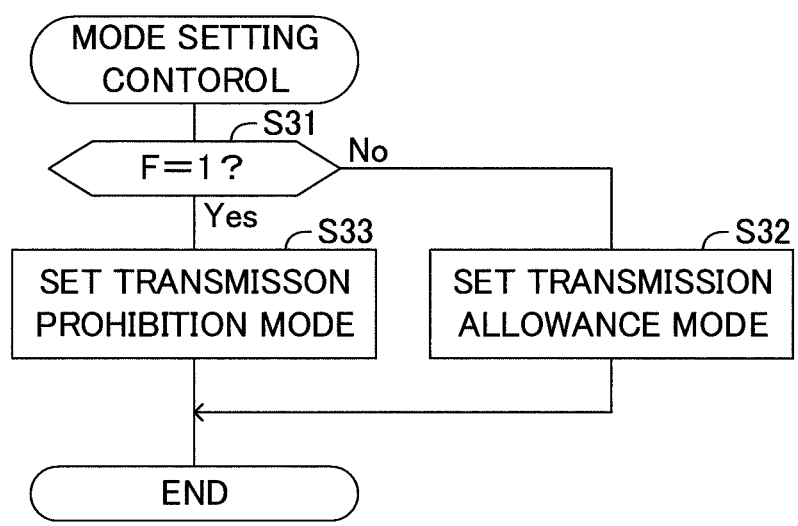
FIG. 7 is a flowchart illustrating a mode setting control routine.

In FIG. 7, a flowchart specifically representing the above process is illustrated. The meter ECU 40 repeatedly executes a mode setting control routine illustrated in FIG. 7 every time the predetermined calculation period elapses. After the meter ECU 40 activates the mode setting control routine, the meter ECU 40 obtains the value of the lane change flag F transmitted to the CAN 100 to determine whether or not the obtained value of the lane change flag F is "1". When the value of the lane change flag F is "0", in other words, when the automatic lane change is not being executed, the meter ECU 40 sets a transmission mode of the blinker activating signal to a transmission allowance mode at Step S32.

The transmission mode of the blinker activating signal can be set to the "transmission allowance mode" or a "transmission prohibition mode". When the transmission mode of the blinker activating signal is set to the transmission allowance mode, the meter ECU 40 transmits the blinker activating signal to the CAN 100 while one of the blinkers 42 is working (being activated). On the other hand, when the transmission mode of the blinker activating signal is set to the transmission prohibition mode, the meter ECU 40 does not transmit the blinker activating signal to the CAN 100 even while one of the blinkers 42 is working.

Accordingly, when the automatic lane change is not being executed (F=0, No at Step S31), the meter ECU 40 transmits the blinker activating signal to the CAN 100 while one of the blinkers 42 is working.

On the other hand, when the meter ECU 40 determines that the value of the lane change flag F is "1" at Step S31, the meter ECU 40 sets the transmission mode to the transmission prohibition mode at Step S33. Therefore, when the automatic lane change is being executed (F=1, Yes at Step S31), the meter ECU 40 does not transmit the blinker activating signal to the CAN 100 even if one of blinkers 42 is working.

When the meter ECU 40 sets the transmission mode at Step S32 or Step S33, the meter ECU 40 terminates the mode setting control routine. The meter ECU 40 repeatedly executes the mode setting control routine every time the predetermined calculation period elapses.

In this modification example, the BSM ECU 10 executes an alert control routine that is the same as the above described alert control routine from which Step 24 is deleted. Hereby, by using the same method as conventional BSM system, the BSM ECU 10 turns on or blinks the indicators 11, without taking into account of whether or not the automatic lane change is being executed. Thus, the driving support apparatus of the present modification can also solve the problems described above.

The driving support apparatuses according to the embodiment and modification of the present invention have been described, but the present invention is not limited to the above-mentioned embodiments, and various changes are possible within the range not departing from the object of the present invention.

In the embodiment, the radar sensors are used as the surround sensors 12 and 21. In some embodiments, other sensors, such as laser sensors, clearance sonars, and camera sensors may be used as the surround sensors 12 and 21. The surround sensors 12 and 21 may be mounted in any positions. The number of the surround sensors 12 and 21 is not limited to particular numbers.

In the embodiment, the start timing when the automatic lane change system starts to perform the automatic lane change depends on the driver's operation of the lane change operation unit 23. The start timing is not limited to the above described timing. In some embodiments, the automatic lane change system comprises a navigation device which includes a GPS receiver, map data, and a calculation processing unit. The navigation device selects the most suitable lane based on the route to the destination. The start timing of the automatic lane change, in this case, may be a timing when it becomes necessary for the own vehicle to change lanes in order to travel on the lane selected by the navigation device.

In the embodiment, the indicators 11 for the first alert and the second alert are installed/mounted in the side mirrors. In some embodiments, the indicators 11 may be disposed on a vehicle interior member (e.g., a left A-pillar and a right A-pillar).

What is claimed is:

1. A driving support apparatus for an own vehicle, comprising:

a sensor that detects either another vehicle in a blind spot behind a driver driving the own vehicle that cannot be viewed by the driver in a side mirror or the another vehicle that will enter the blind spot behind the driver that cannot be viewed by the driver in the side mirror;

an indicator; and an electronic control unit that is configured to:

determine whether or not the sensor has detected the another vehicle;

determine whether or not the driver has activated a turn signal;

perform automatic lane change control in which the own vehicle can automatically change lanes while activating the turn signal without receiving input from the driver;

produce a first alert with the indicator when the sensor detects the another vehicle, and the turn signal is not activated, produce a second alert with the indicator that is different than the first alert when the sensor detects the another vehicle, the turn signal is activated to a side of the own vehicle where the sensor detects the another vehicle, and the automatic lane change control is not being performed, and produce the first alert with the indicator and prohibit the second alert when the sensor detects the another vehicle, the turn signal is activated to the side of the own vehicle where the sensor detects the another vehicle, and the automatic lane change control is being performed.

* * * * *